United States Patent
Arasaki

(10) Patent No.: US 10,132,348 B2
(45) Date of Patent: Nov. 20, 2018

(54) BEARING AND BEARING DEVICE

(71) Applicant: TAIHO KOGYO Co., Ltd., Toyota-shi, Aichi (JP)

(72) Inventor: Shinya Arasaki, Toyota (JP)

(73) Assignee: TAIHO KOGYO CO., LTD., Toyota-shi, Aichi (JP)

( * ) Notice: Subject to any disclaimer, the term of this patent is extended or adjusted under 35 U.S.C. 154(b) by 0 days.

(21) Appl. No.: 15/325,903

(22) PCT Filed: Nov. 24, 2015

(86) PCT No.: PCT/JP2015/082919
§ 371 (c)(1),
(2) Date: Jan. 12, 2017

(87) PCT Pub. No.: WO2016/136058
PCT Pub. Date: Sep. 1, 2016

(65) Prior Publication Data
US 2017/0167532 A1     Jun. 15, 2017

(30) Foreign Application Priority Data
Feb. 27, 2015 (JP) .................................. 2015-038565

(51) Int. Cl.
*F16C 35/00* (2006.01)
*F16C 17/02* (2006.01)
(Continued)

(52) U.S. Cl.
CPC ............ *F16C 17/022* (2013.01); *B62D 1/181* (2013.01); *F16C 17/02* (2013.01); *F16C 33/08* (2013.01); *F16C 33/14* (2013.01); *F16C 33/20* (2013.01); *F16C 35/02* (2013.01)

(58) Field of Classification Search
CPC ........ F16C 17/022; F16C 33/08; F16C 33/20; F16C 35/02; B62D 1/16; B62D 1/18; B62D 1/181
See application file for complete search history.

(56) References Cited

U.S. PATENT DOCUMENTS 5,727,885 A   3/1998   Ono et al.
6,312,159 B1  11/2001  Ishida et al.
(Continued)

FOREIGN PATENT DOCUMENTS

DE    199 59 636 A1   7/2000
DE    103 14 435 A1   10/2004
(Continued)

OTHER PUBLICATIONS

International Search Report for PCT/JP2015/082919 (2 pgs).
(Continued)

*Primary Examiner* — Phillip A Johnson
(74) *Attorney, Agent, or Firm* — Flynn Thiel, P.C.

(57) ABSTRACT

The rotation of a bearing is suppressed without the need for a projecting portion on an outer circumferential surface of an arc portion in the bearing. Bearing 10 includes arc portion 11 in which a cross section orthogonal to an axial direction has an arc shape, and rotation suppressing portion 12 and rotation suppressing portion 13 that extend respectively from a first end and a second end of an arc in arc portion 11 and include a portion projecting outward from a circumcircle of arc portion 11 in the cross section orthogonal to the axial direction.

7 Claims, 3 Drawing Sheets

(51) Int. Cl.
*B62D 1/181* (2006.01)
*F16C 35/02* (2006.01)
*F16C 33/08* (2006.01)
*F16C 33/14* (2006.01)
*F16C 33/20* (2006.01)

(56) References Cited

U.S. PATENT DOCUMENTS

2013/0074639 A1* 3/2013 Toyoda .................. B62D 1/181
                                                    74/493
2014/0284910 A1* 9/2014 Schnitzer ............... B62D 1/184
                                                    280/779

FOREIGN PATENT DOCUMENTS

| | | |
|---|---|---|
| DE | 20 2006 014 691 U1 | 1/2007 |
| EP | 1 223 356 A1 | 7/2002 |
| EP | 2 060 807 A1 | 5/2009 |
| EP | 2 808 225 A1 | 12/2014 |
| FR | 2783789 A1 * | 3/2000 ............... B62D 1/16 |
| JP | 09-210064 A | 8/1997 |
| JP | 2006-045628 A | 2/2006 |
| JP | 2010-156365 A | 7/2010 |
| JP | 2013-067310 A | 4/2013 |
| JP | 2013-067313 A | 4/2013 |
| JP | 2013-112327 A | 6/2013 |

OTHER PUBLICATIONS

Extended European Search Report for corresponding application No. 15883348.3, dated May 23, 2017 (8 pages).
Chinese Office Action from corresponding application No. 201580059155.5, dated Jul. 26, 2018, including partial English translation (7 pages).

* cited by examiner

BEARING AND BEARING DEVICE

TECHNICAL FIELD

The present invention relates to a bearing and a bearing device.

BACKGROUND ART

A technique that uses an arc-shaped bearing rather than a cylindrical bearing as a bearing for supporting a movable column member of a steering shaft in a steering device of a vehicle is known (Patent Documents 1 and 2, for example). In general, use of an arc-shaped bearing causes a problem in that the bearing easily rotates. That is, the bearing shifts due to the application of force in the circumferential direction of the shaft. In order to address this, in Patent Documents 1 and 2, a large projecting portion is formed on the outer circumferential surface of a resin bearing, a recessed portion that meshes with the projecting portion is formed in a housing, and rotation of the bearing is prevented due to the meshing between the projecting portion and the recessed portion.

CITATION LIST

Patent Documents

Patent Document 1: JP 2013-67310A
Patent Document 2: JP 2013-67313A

SUMMARY

Technical Problem

The techniques disclosed in Patent Documents 1 and 2 have a problem in that the force for rotating the bearing is applied to the projecting portion, and thus the projecting portion is susceptible to damage.

In order to address this, the present invention provides a technique for suppressing the rotation of the bearing without the necessity of a projecting portion on the outer circumferential surface of an arc portion in the bearing.

Solution to Problem

According to one aspect of the invention, there is provided a bearing including an arc portion in which a cross section orthogonal to an axial direction has an arc shape and a first rotation suppressing portion that extends from a first end of an arc in the arc portion and includes a portion projecting outward from a circumcircle of the arc portion in the cross section orthogonal to the axial direction.

This bearing may further include a second rotation suppressing portion that extends from a second end of the arc in the arc portion and includes a portion projecting outward from the circumcircle of the arc portion in the cross section orthogonal to the axial direction.

The first rotation suppressing portion may have a length longer than or equal to 5% of a radius of the arc portion.

A projecting portion need not be formed on an outer circumferential surface of the arc portion.

The arc portion and the first rotation suppressing portion may be integrally formed of metal.

According to another aspect of the invention, there is provided a bearing device including a shaft, a housing in which the shaft is accommodated and that has a cross section having an arc-shaped inner circumferential surface, the cross section being orthogonal to a direction in which the shaft extends, and a bearing including an arc portion in which a cross section orthogonal to the direction in which the shaft extends has an arc shape and a rotation suppressing portion that extends from a first end of an arc in the arc portion and in which a cross section orthogonal to the aforementioned direction has a linear shape.

The shaft may be configured to be connected to a steering wheel.

Advantageous Effects of Invention

With the present invention, the rotation of the bearing can be suppressed without the necessity of a projecting portion on the outer circumferential surface of the arc portion in the bearing.

REFERENCE SIGNS LIST

1 . . . Steering device, 10 . . . Bushing, 11 . . . Arc portion, 12 . . . Rotation suppressing portion, 13 . . . Rotation suppressing portion, 20 . . . Steering shaft, 30 . . . Housing, 31 . . . Housing body, 32 . . . Lid, 33 . . . Pin, 34 . . . Spring, 35 . . . Washer, 40 . . . Telescopic mechanism, 41 . . . Movable column, 411 . . . Inner tube, 412 . . . Outer tube, 50 . . . Tilt mechanism

DESCRIPTION OF EMBODIMENTS

Figure 1:
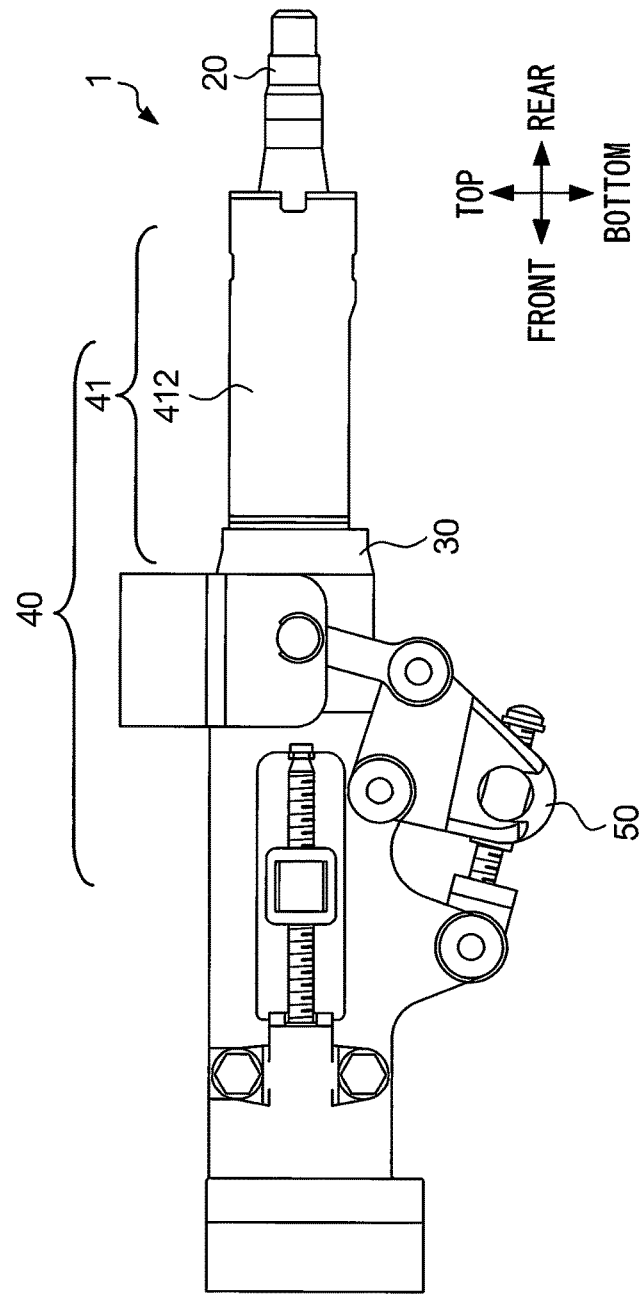
FIG. 1 is a diagram showing the external appearance of steering device 1 according to an embodiment.

FIG. 1 is a diagram showing the external appearance of a steering device 1 according to an embodiment. Steering device 1 is an example of a bearing device using bushing 10 (an example of a bearing) according to an embodiment, and is used in an automobile. Steering device 1 includes steering shaft 20, housing 30, telescopic mechanism 40, and tilt mechanism 50.

Steering shaft 20 transmits the rotation of a steering wheel (not shown) to a steering gearbox (not shown). Steering shaft 20 is accommodated in housing 30. Telescopic mechanism 40 is a mechanism for adjusting the position of the steering wheel in the front-rear direction (in the axial direction of steering shaft 20; in the horizontal direction in FIG. 1). Tilt mechanism 50 is a mechanism for adjusting the position of the steering wheel in the vertical direction (in a direction orthogonal to the axial direction of steering shaft 20; in the vertical direction in FIG. 1). The telescopic mechanism and the tilt mechanism are driven by motors (not shown), for example.

Telescopic mechanism 40 includes movable column 41. Movable column 41 includes inner tube 411 (not shown in FIG. 1), outer tube 412, and a telescopic tube (not shown). Steering shaft 20 is accommodated in inner tube 411. Inner tube 411 supports steering shaft 20 via a bearing (not shown). Steering shaft 20 can be rotated relative to inner tube 411. However, steering shaft 20 and inner tube 411 do not move (slide) relative to each other in the front-rear direction. Inner tube 411 is accommodated in outer tube 412. The outer tube is accommodated in the telescopic tube. Inner tube 411 and outer tube 412 are not rotated relative to each other, and both inner tube 411 and outer tube 412 as well as the telescopic tube move integrally; that is, slide, relative to housing 30 in the axial direction. Furthermore, when a heavy load is applied to steering shaft 20, inner tube 411 slides relative to outer tube 412 and absorbs the energy. That is, when steering shaft 20 is rotated as a result of the operation of the steering wheel, inner tube 411 and outer tube 412 are not rotated. The position of the steering wheel in the front-rear direction is adjusted by moving (sliding) inner tube 411, outer tube 412, and steering shaft 20 in the front-rear direction relative to housing 30.

FIG. 2(A) is a cross-sectional view of steering device 1 taken along line A-A, and FIG. 2(B) is a cross-sectional view of steering device 1 taken along line B-B. It should be noted that in these figures, inner tube 411 and outer tube 412 are shown merely as movable column 41 in order to simplify the figures. Housing 30 includes housing body 31 and lid 32. Housing body 31 supports inner tube 411 and steering shaft 20 via bushing 10. The upper portion (a side opposite to bushing 10 with respect to steering shaft 20) of housing body 31 is open. This opening is covered with lid 32.

A plurality of (two in this example) holes are formed in lid 32. Pins 33 are inserted into the holes. Washers 35 are provided between pins 33 and inner tube 411. Springs 34 apply a load to washers 35. That is, springs 34 press down inner tube 411 and steering shaft 20 from above. Disk springs are used as springs 34, for example.

In this example, springs 34 are arranged at the same positions as bushings 10 in the axial direction (front-rear direction). Bushings having a cylindrical shape cannot be arranged at the same positions as springs 34 in the axial direction in this manner. Using bushings 10 having a U shape makes it possible to arrange springs 34 at positions corresponding to bushings 10. Therefore, the entire length of movable column 41 can be reduced, and thus telescopic mechanism 40 can be configured to have a smaller size. Moreover, it is required to secure the sliding range of the bushings to about 180° in order to support inner tube 411 and steering shaft 20 firmly. However, if bushings that have an arc-shaped outer circumference are used, there is a risk that the bushings will rotate relative to housing body 31 and shift. For this reason, bushings 10 according to this embodiment are formed in a U shape.

Figure 3:
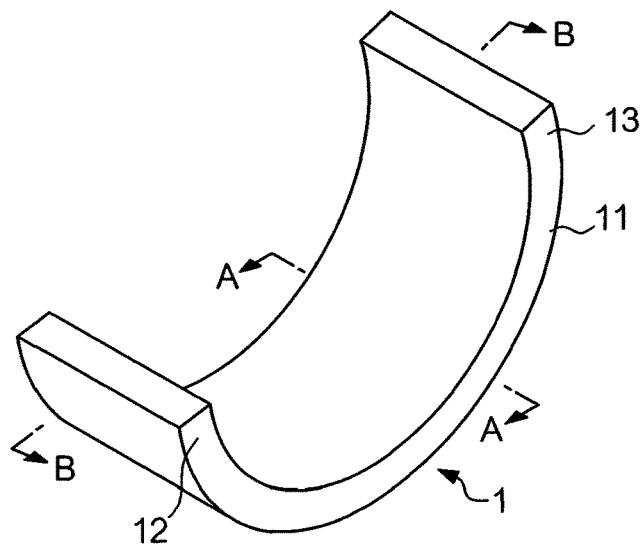
FIG. 3 is a diagram showing the external appearance of bushing 10.
Figure 4:
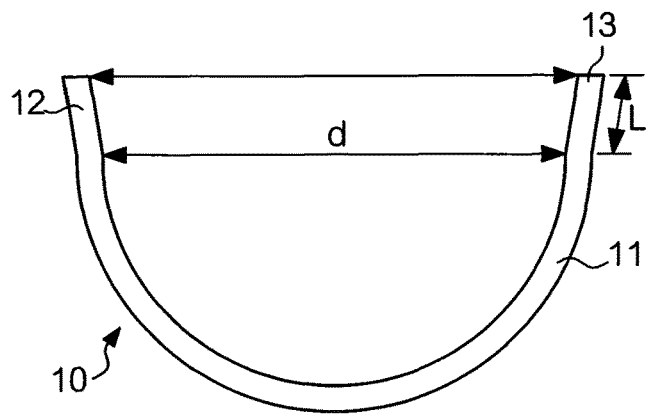
FIG. 4 is a cross-sectional view of bushing 10 taken along line V-V.

FIG. 3 is a diagram showing the external appearance of bushing 10, and FIG. 4 is a cross-sectional view of bushing 10 taken along line V-V. Bushing 10 includes arc portion 11, rotation suppressing portion 12, and rotation suppressing portion 13. Arc portion 11, rotation suppressing portion 12, and rotation suppressing portion 13 are integrally formed of a metal. The metal may be constituted by a single metal or an alloy. Furthermore, bushing 10 may be entirely constituted by a single layer or a multilayered structure (e.g., bimetal).

In addition, a coating layer containing a binder resin and an additive may be formed on the sliding surface of bushing 10. At least one thermosetting resin, such as a polyamide-imide (PAI) resin, a polyimide (PI) resin, an epoxy resin, a polyether ether ketone resin, and a phenol resin, can be used as the binder resin. The additive includes a solid lubricant, for example. The solid lubricant is added in order to improve the frictional characteristics. The solid lubricant includes at least one of graphite, $MoS_2$, $WS_2$, polytetrafluoroethylene (PTFE), h-BN, CF, and $SB_2O_3$.

Arc portion 11 is a portion in which the outer circumferential surface of the cross section orthogonal to the axial direction has an arc shape. It should be noted that the "arc" herein is not necessarily a mathematically exact arc. The two end portions of bushing 10 are more spaced apart than those of an exact arc, in order to prevent the rotation of bushing 10 due to the tension applied to housing 30 during installation. That is, in arc portion 11, the arc diameter R of the end portions (portions near rotation suppressing portion 12 and rotation suppressing portion 13) is larger than that of portions near the central portion. Rotation suppressing portion 12 and rotation suppressing portion 13 have a shape in which the outer circumferential surface of the cross section has a portion projecting outward from a circumcircle of arc portion 11. In this example, rotation suppressing portion 12 and rotation suppressing portion 13 are linear portions having a linear shape. Bushing 10 is designed to have a size in accordance with the sizes of steering shaft 20 and the like. For example, the inner circumference of arc portion 11 has a radius d of 20 to 30 mm, and rotation suppressing portion 12 and rotation suppressing portion 13 each have a length L of 1 mm to 10 mm.

It is preferable that rotation suppressing portion 12 and rotation suppressing portion 13 each have a length longer than or equal to 5% of the radius d. When vibration is applied to steering shaft 20, a very small rotary load is applied to bushing 10 due to friction. When the yield point of bushing 10 is larger than the applied rotary load, an effect of suppressing the rotation of bushing 10 is obtained. Although the lengths of rotation suppressing portion 12 and rotation suppressing portion 13 that are sufficient to obtain the rotation suppressing effect vary depending on the operating conditions and the like, it is clear from the result of one computer simulation conducted by the inventors of this application that when rotation suppressing portion 12 and rotation suppressing portion 13 each have a length longer than or equal to 5% of the radius d, a certain rotation suppressing effect is obtained.

Rotation suppressing portion 12 and rotation suppressing portion 13 extend outward in order to apply tension to housing body 31 and facilitate the fixation to housing body 31. That is, the distance between rotation suppressing portion 12 and rotation suppressing portion 13 is larger than the distance between the end portions of arc portion 11.

In this example, a projecting portion is not formed on the outer circumference of arc portion 11. However, the rotation of bushing 10 is suppressed due to rotation suppressing portion 12 and rotation suppressing portion 13.

The present invention is not limited to the above-described embodiment, and various modifications can be made. Hereinafter, some modified examples will be described. The modified examples described below may be used in combination of two or more.

Rotation suppressing portion 12 and rotation suppressing portion 13 may differ in length (length from the end portion of arc portion 11 in the cross section orthogonal to the axial direction).

Figure 5:
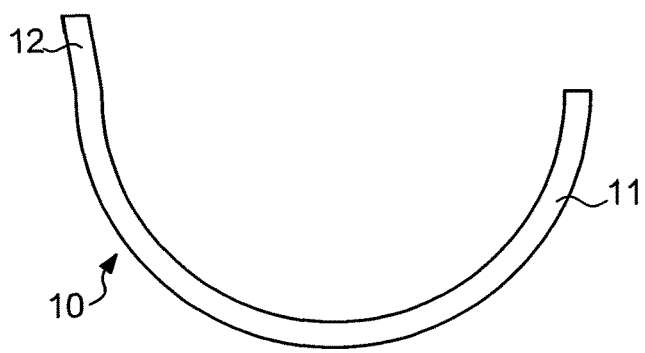
FIG. 5 is a diagram showing the structure of bushing 10 according to a modified example.

FIG. 5 is a diagram showing the structure of bushing 10 according to a modified example. This figure shows the cross section in the same manner as in FIG. 4. In this example, bushing 10 includes rotation suppressing portion 12 but no rotation suppressing portion 13. That is, bushing 10 may include only one rotation suppressing portion at one of the two end portions of the arc in the arc portion 11.

The shapes of rotation suppressing portion 12 and rotation suppressing portion 13 are not limited to the linear shape described in the embodiment. As long as the rotation of bushing 10 can be suppressed, the outer circumferential surface of the cross section orthogonal to the axial direction may have an arc shape or a shape with projecting portions and recessed portions (e.g., a wavy shape or a saw-toothed shape) instead of the linear shape.

The shape of arc portion 11 is not limited to the shape shown as an example of the embodiment. An example in which the arc has a central angle of 180° is shown in the embodiment. However, the central angle of the arc in arc portion 11 may be smaller or larger than 180°.

Figure 2:
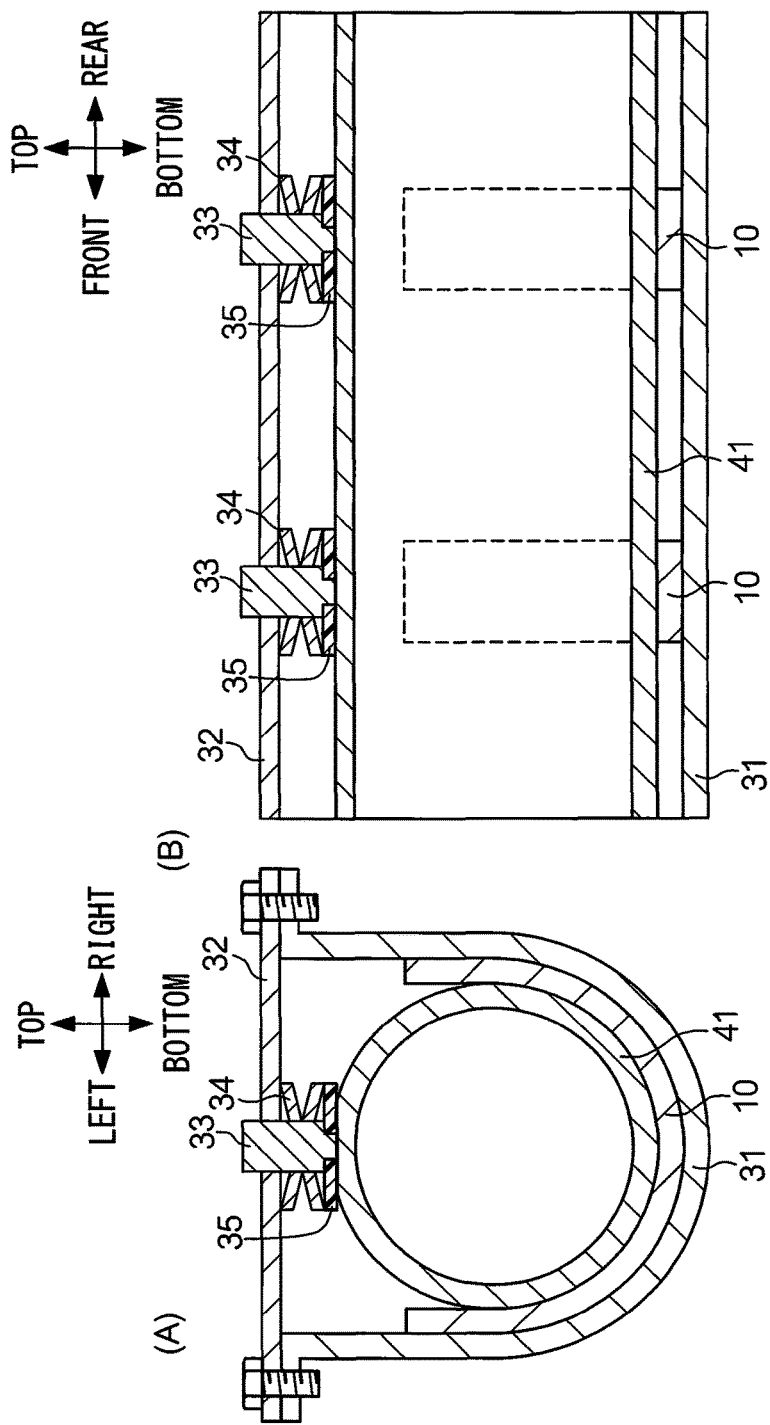
FIG. 2 shows cross-sectional views of steering device 1.

The specific structure of steering device 1 is not limited to the structure described in the embodiment. Furthermore, the application of bushing 10 is not limited to an application to a steering device, and bushing 10 may be used in any device. Since the upper portion of bushing 10 is open, particularly as shown in FIG. 2 as an example, the structure can be employed in which the position at which a load is applied to the shaft (i.e., the position at which spring 33 is provided) and the position at which the shaft is supported (i.e., the position at which bushing 10 is provided) overlap each other, and therefore, bushing 10 is preferable for a device having such a structure.

The invention claimed is:

1. A bearing comprising:
   a semicircular arc portion in which a cross section orthogonal to an axial direction has an arc shape; and
   first and second linear-shaped rotation suppressing portions that respectively extend from first and second ends of an arc in the arc portion and include portions projecting outward from a circumcircle of the arc portion in the cross section orthogonal to the axial direction.

2. The bearing according to claim 1, wherein
   the first rotation suppressing portion has a length longer than or equal to 5% of a radius of the arc portion.

3. The bearing according to claim 1, wherein
   a projecting portion is not formed on an outer circumferential surface of the arc portion.

4. The bearing according to claim 1, wherein
   the arc portion and the rotation suppressing portions are integrally formed of metal.

5. A bearing device comprising:
   a shaft;
   a housing in which the shaft is accommodated and that has a cross section having an arc-shaped inner circumferential surface, the cross section being orthogonal to a direction in which the shaft extends;
   a semicircular arc portion in which a cross section orthogonal to an axial direction has an arc shape; and
   first and second linear-shaped rotation suppressing portions that respectively extend from first and second ends of an arc in the arc portion and includes a portion projecting outward from a circumcircle of the arc portion in the cross section orthogonal to the axial direction.

6. The bearing device according to claim 5, wherein
   the shaft is configured to be connected to a steering wheel.

7. The bearing device according to claim 5, wherein the housing has a U-shaped inner surface in a cross-section orthogonal to the axial direction.

* * * * *